June 18, 1946.   K. E. BUTLER   2,402,365
AUTOMATIC AUXILIARY PLOW
Filed March 24, 1945
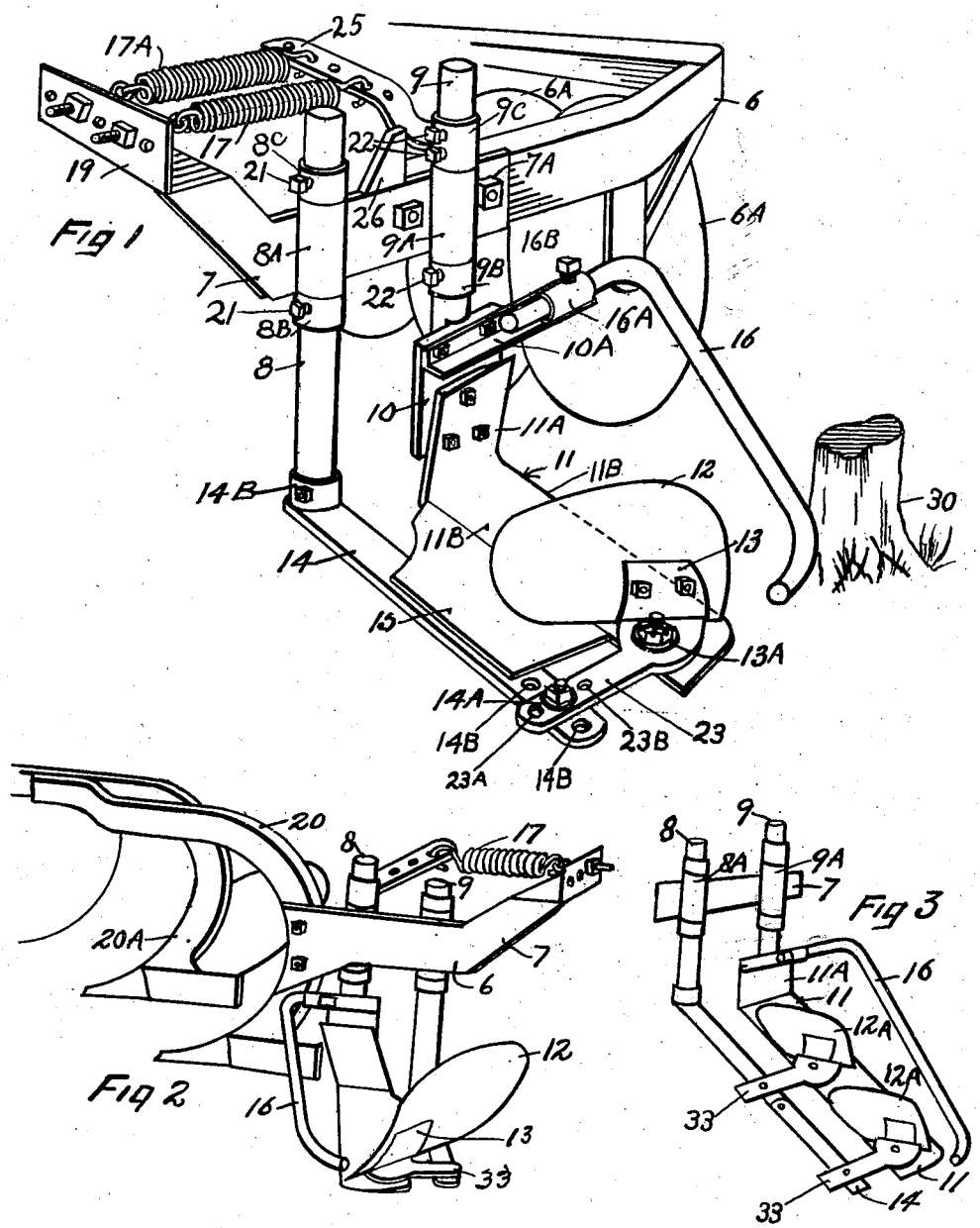
KENNETH E BUTLER, Inventor
By Francis C. Huebner,
Attorney Patented June 18, 1946

2,402,365

UNITED STATES PATENT OFFICE 2,402,365

AUTOMATIC AUXILIARY PLOW

Kenneth E. Butler, Reedley, Calif.

Application March 24, 1945, Serial No. 584,598

3 Claims. (Cl. 97—137)

My invention relates to an auxiliary plow, sometimes termed a French plow. The object of my invention to attach my French plow to a disc harrow, or other plow or earth working tool when used in a vineyard or orchard, my auxiliary plow being adapted to automatically stir and turn the earth adjacent to the trees or vines, and between the trees and vines in the row. The main object of my invention is the automatic and efficient manner of cultivating the soil between the vines or trees in any row while plowing or cultivating the earth between the rows of such vines or trees. Other objects will hereinafter be disclosed.

In the drawing herewith which is hereby made a part of this application, Fig. 1 is a perspective view of my device as attached to a disc harrow. Fig. 2 shows the same device attached to a gang plow. Fig. 3 is a slightly modified form of my device having two mouldboards to turn over the loosened soil instead of one mouldboard as shown in Figs. 1 and 2.

Referring to the drawing, in Fig. 1 I have shown the carrying frame 6 of a disc harrow having disc blades 6A. This disc harrow is shown fractional only, and simply for the purpose of showing how my auxiliary plow is attached. The part of frame 6 shown represents the right hand side of the disc frame. A bracket 7 is attached to disc frame 6 with bolts 7A. Bracket 7 consists of a flat portion which is positioned on a parallel plane to the side of frame 6 to which it is attached, and a portion 19 which extends at approximately right angles to the plane of the side of frame 6, said portion 19 acting as an anchor for springs 17 and 17A hereinafter referred to. I have provided two upright shafts 8 and 9 which are positioned with parallel center lines, and adapted to be rotated within bearings 8A and 9A which bearings are attached to the portion of bracket 7 on the parallel with the disc frame 6.

Collars 8B and 8C on the lower and upper ends of bearing 8A are adapted to permit shaft 8 to be lowered or raised and by adjusting the shaft to the height desired it can be held in that position by clamping collars 8B and 8C to shaft 8 with cap screws. Likewise shaft 9 can be adjusted as to height with collars 9B and 9C, and tightened with cap screws 22.

At the lower end of shaft 9 I have attached a plate 10 which is intended as a support for the working elements herein described. A cutter blade 11 consists of a wide blade somewhat sharpened on the front edge. When assembled with the device cutting blade 11 is positioned so lines drawn lengthwise on the blade would be parallel with the earth, and lines drawn across the blade would be slightly angular with the earth, the slope being toward the front or cutting edge 11B. A flange, or bent up portion 11A is adapted to be bolted firmly to plate 10.

At the bottom of shaft 8 is attached an arm 14 which extends outward therefrom approximately parallel to blade 11. The free ends of blade 11 and arm 14 are connected with a tie 23 which tie is pivotally attached to arm 14 with a bolt 14A, and to blade 11 with a pivotal bolt 13A. Tie 23 has a support 13 thereon which is adapted to hold a mouldboard 12. This mouldboard has a compound curved face which is similar to mouldboards in general use and is adapted to turn over the soil coming in contact therewith. Inasmuch as the cutting blade is sloped so that the cutting blade will enter the earth along its cutting edge, it is noted that the rear portion of the blade will be slightly spaced from the surface of the earth over which the cutting edge has passed, and as tie 23 is on a parallel plane with the upper face of blade 11, arm 14 is likewise raised to a position so it will not drag on the surface of the earth. An apron 15 extends from the rear of blade 11, to which it is attached, to an overlapping position on arm 14.

On plate 10 is attached bracket 10A, which bracket supports a tubular member 16A. A guard 16 consists of a rod having one end thereof bent angular to the main guard, and the opposite end bent in a curve as shown in the drawing. The angular end of guard 16 is inserted in tubular member 16A so that the curved end of the guard can be adjusted vertically, and when the desired height is secured set screw 16B can be tightened to clamp the guard in that position. The object of guard 16 is to engage any vine, tree or other obstruction which extends above the ground and which it is not the desire to move or mar with the plow, and the pressure of the guard against the obstruction, shown as 30 in Fig. 1, will cause the entire auxiliary plow assembly to swing backwards and avoid contact between the plow and the obstruction. It is noted that collar 9C is rigidly connected with shaft 9, and collar 9C has attached thereto a lever 25. Expansion springs 17 and 17A which are anchored at one end to anchor member 19 and attached at the other end to lever 25, the object of said springs being to normally hold the plow in a forward position, which forward position is limited by stop 26.

One of the objects of my invention is to hold the mouldboard in constant position to turn over the soil in which it comes in contact whether the plow is in normal positions fixed by springs 17 and 17A, and stop 26, or whether it is forced rearward by guard 16 coming in contact with an obstruction. Inasmuch as mouldboard 12 is pivotally connected with blade 11 through pivot 13A holding tie 23 and mouldboard bracket 13, when the obstruction 30 contacts guide rod 16, and the auxiliary plow assembly is moved backward to avoid the obstruction, there are two centers for this radial movement, to-wit, shafts 8 and 9, and the mouldboard will be held in the same angular position with the forward path of travel of the device regardless of the backward, or forward position of the auxiliary plow.

It is noted that there are a plurality of selective adjustments in the assembling of arm 14 and tie 23, in that arm 14 has a plurality of holes 14B, and tie 23 has a plurality of holes 23B which can be used in pivoting arm 14 and tie 23 together.

Fig. 2 shows the same auxiliary plow as described in Fig. 1, except that the means for attaching the auxiliary plow assembly to the plow is a bracket 7A which is modified in form so it will bolt on to plow beam 20, and in said Fig. 2 I have shown the use of one spring 17 only to hold the auxiliary plow in an advanced position.

In Fig. 3 I have shown duplicate mouldboards 12A which are attached to duplicate ties 33. Each of duplicate mouldboards 12A are similar in all respects to mouldboard 12, and ties 33 are in all respects similar to tie 23.

It is understood that single spring 17 shown in Fig. 2 can be substituted with a plurality of springs.

Having described my invention I claim as new and ask for Letters Patent:

1. In combination with an earth working tool, an auxiliary plow consisting of a bracket support adapted to be attached to the earth working tool, two bearings attached to the support positioned vertically with their center lines in parallel relation, each of said bearings carrying a vertical shaft adapted to rotate in the bearing, the front shaft carrying at its lower end a cutter extending at approximately right angles to the shaft to which it is attached, the rear shaft carrying at its lower end an arm extending on a line approximately parallel to the cutter blade, a tie connecting the free ends of the cutter blade and the arm, said tie being pivotally connected to the cutter blade and to the arm, a mouldboard supported on the tie, a guard rod extending in front of, and slightly beyond the auxiliary plow assembly, said guard rod being adapted to swing the auxiliary plow assembly out of its normal line of travel when the guard rod engages an obstruction, and yielding means for returning the auxiliary plow assembly to its normal path of travel.

2. A device described in claim 1 in which the cutter plate is positioned with a lateral slope.

3. An automatic auxiliary plow adapted to be used in connection with an independent earth working tool consisting of a bracket adapted to be attached to the independent earth working tool, two vertical shafts positioned parallel with each other, spaced apart, and held in bearings attached to the bracket, said vertical shafts being adapted to turn within their bearings, a cutting blade attached to the lower end of one of the shafts, and an arm attached to the other shaft and extending approximately parallel to the cutting blade, the cutting blade being positioned on a slant from the back downwards to the cutting edge, a tie pivotally connected at each end to the cutting blade and to the arm, the tie adapting the arm to move in unison with the cutting blade, a mouldboard attached to the tie directly over the cutting blade and adjacent thereto, yielding means adapted to hold the cutting blade and mouldboard in working relation with the independent earth working tool, a guard positioned in front of the auxiliary plow, said guard being adapted when moved by an obstruction in line with the path of travel of the auxiliary plow to swing the auxiliary plow assembly carried by the vertical shafts about spaced pivots out of line of the normal path of travel of the auxiliary plow, the yielding means being adapted to return the plow to its normal position when the obstruction is passed.

KENNETH E. BUTLER.